United States Patent
Aizen et al.

(10) Patent No.: US 9,448,983 B2
(45) Date of Patent: Sep. 20, 2016

(54) DEVICE, METHOD AND COMPUTER PROGRAM PRODUCT FOR GENERATING WEB FEEDS

(71) Applicant: Yahoo! Inc., Sunnyvale, CA (US)

(72) Inventors: Jonathan Aizen, San Francisco, CA (US); Eran Shir, Kfar Saba (IL)

(73) Assignee: Yahoo! Inc., Sunnyvale, CA (US)

( * ) Notice: Subject to any disclaimer, the term of this patent is extended or adjusted under 35 U.S.C. 154(b) by 234 days.

(21) Appl. No.: 14/191,113

(22) Filed: Feb. 26, 2014

(65) Prior Publication Data

US 2014/0181642 A1    Jun. 26, 2014

Related U.S. Application Data

(63) Continuation of application No. 11/868,981, filed on Oct. 9, 2007, now Pat. No. 8,706,757.

(60) Provisional application No. 60/901,115, filed on Feb. 14, 2007.

(51) Int. Cl.
*G06F 17/30* (2006.01)
*G06F 17/22* (2006.01)

(52) U.S. Cl.
CPC ..... *G06F 17/2247* (2013.01); *G06F 17/30893* (2013.01)

(58) Field of Classification Search
CPC ................................................. G06F 17/30893
See application file for complete search history.

(56) References Cited

U.S. PATENT DOCUMENTS

| | | | | |
|---|---|---|---|---|
| 2002/0111966 A1* | 8/2002 | Fukuda | .................. | G06F 17/211 715/230 |
| 2004/0002967 A1* | 1/2004 | Rosenblum | ........ | G06Q 30/0241 |
| 2005/0193010 A1* | 9/2005 | DeShan | .................. | G06Q 30/02 |
| 2005/0267973 A1* | 12/2005 | Carlson | .................. | G06Q 30/06 709/228 |
| 2005/0289147 A1* | 12/2005 | Kahn | ................. | G06F 17/30893 |
| 2006/0053376 A1* | 3/2006 | Ng | ..................... | G06F 17/30873 715/742 |
| 2006/0167860 A1* | 7/2006 | Eliashberg | ............. | G06Q 30/06 |
| 2006/0230021 A1* | 10/2006 | Diab | .................. | G06F 17/30873 |
| 2006/0287989 A1* | 12/2006 | Glance | .............. | G06F 17/30587 |
| 2006/0288329 A1* | 12/2006 | Gandhi | ............... | G06F 17/3089 717/114 |
| 2007/0027932 A1* | 2/2007 | Thibeault | ............ | G06F 17/3089 |
| 2007/0156809 A1* | 7/2007 | Dickinson | .............. | G06Q 10/06 709/203 |
| 2007/0204010 A1* | 8/2007 | Sah | ........................ | G06Q 30/02 709/219 |
| 2008/0088735 A1* | 4/2008 | Biniak | ............... | H04N 7/17318 348/468 |
| 2008/0147606 A1* | 6/2008 | Read | .................. | G06F 17/30873 |
| 2008/0235594 A1* | 9/2008 | Bhumkar | .......... | G06F 17/30991 715/738 |
| 2008/0295164 A1* | 11/2008 | Steiner | .................... | H04L 63/10 726/14 |

* cited by examiner

*Primary Examiner* — Grace Park
(74) *Attorney, Agent, or Firm* — Brinks Gilson & Lione

(57) ABSTRACT

A system for dynamically defining a web feed includes a memory unit adapted to store web feed data and to generate a web feed of selected web content. The system includes an input processor to receive a user input defining one or more remote websites and to retrieve remote web content from the one or more remote websites. A user interface is provided to display a set of identified elements from the remote web content in a display area of a primary website and a selection processor receives a user selection identifying one or more selected elements of the remote web content. An equivalency engine calculates equivalency classes including subsets of the identified elements determined to be structurally similar to the selected elements. A web feed is generated and displayed to the user on the primary website that includes at least the selected elements and one or more of the subsets of the identified elements determined to be structurally similar to the selected elements.

13 Claims, 4 Drawing Sheets

Change similarity detection 502 
Isolate 503 
Select 504 
Select inside 506

Web page area 510

Feed preview area 550

Selected elements area 520 
Fields area 525 
Groups area 530

500

DEVICE, METHOD AND COMPUTER PROGRAM PRODUCT FOR GENERATING WEB FEEDS

PRIORITY CLAIM

This application is a continuation of U.S. patent application Ser. No. 11/868,981, filed Oct. 9, 2007, now issued as U.S. Pat. No. 8,706,757, which claims priority to U.S. Provisional Patent Application 60/901,115, filed Feb. 14, 2007, both of which are incorporated by reference herein.

TECHNICAL FIELD

The present invention relates to a method, a device and a computer program product for generating feeds.

BACKGROUND

Web feeds (also referred to as feeds or channels) are data formats used for serving users frequently updated content. A web feed can include multiple items. U.S. Patent Application Pub. No. 2006/0288329 of Gandhi et al., which is incorporated herein by reference, illustrates a content syndication platform.

Content distributors syndicate a web feed, thereby allowing users to subscribe to it, accordingly only content that is included in a predefined web feed can be syndicated. Content distributors sometimes also define a programmatic interface to their content (also known as an API), which allows programmatic access to the content.

There is a growing need to provide a more flexible and yet simple system, method and computer program product for defining distributable content from any web source, not just those that have a predefined feed or API. For example, this is a key requirements in the creation of "web mashups" (programmatic combination multiple web sites and other data sources) existence of feeds and APIs.

SUMMARY

A method for generating a feed, the method includes: receiving selection information representative of a selection of a selected element out of multiple elements of a web content; and generating an equivalent indication representative of at least one equivalent element that is similar to the selected elements.

A system for dynamically defining a web feed is provided including memory unit adapted to store web feed data and to generate a web feed of selected web content. The system includes an input processor to receive a user input defining one or more remote websites and to retrieve remote web content from the one or more remote websites. The system includes a user interface to display a set of identified elements from the remote web content in a display area of a primary website and a selection processor to receive a user selection identifying one or more selected elements of the remote web content. An equivalency engine calculates equivalency classes including subsets of the identified elements determined to be structurally similar to the selected elements. A web feed is generated and displayed to the user on the primary website that includes at least the selected elements and one or more of the subsets of the identified elements determined to be structurally similar to the selected elements.

A non-transitory computer readable storage medium having stored therein data representing instructions executable by a programmed processor for dynamically defining a web feed, is provided to receive a sample set of remote webpages, and to extract content from the remote webpages to produce a set of identified elements. The set of identified elements are displayed in a display area of a primary website, and the structural similarities of the identified elements are determined. Associated keys are assigned to each identified element describing a structural characteristic of the identified element. A subset of the identified elements determined to be structurally similar based at least on the associated keys are grouped in equivalency classes. A user selection is received identifying one or more selected elements from the set of identified elements displayed on the primary website, and a web feed is generated and displayed to the user in the display area of the primary website including the selected elements and the subset of identified elements.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the preferred embodiments.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

Figure 1:
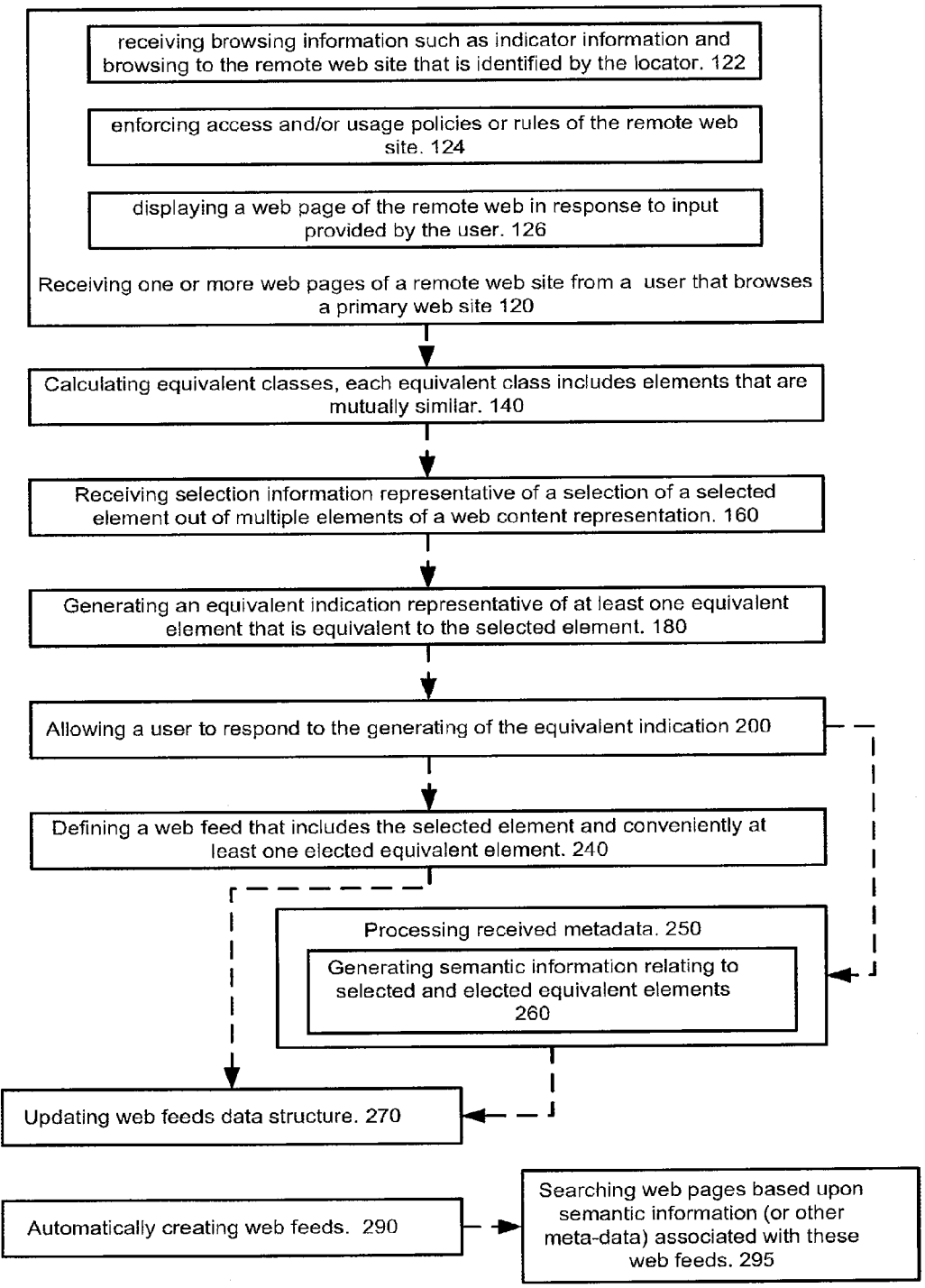
FIG. 1 illustrates a method for generating a web feed, according to an embodiment of the invention and also initial uses of such feed creation techniques.

The term "feed" as used herein below refers to preconfigured feeds such as RSS feeds, and dynamic feeds that require input before providing the feed also known as APIs.

The term "web content" as used herein below refers to content accessible over the Internet. It may include a web page, a portion of a web page, information that is included in a web page, and the like.

The method, computer program product and system for generating and distributing web feeds.

The system maintains a primary website that can be accessed by users that wish to generate web feeds, update web feeds or delete web feeds. Once a user browses to the primary website the system enables the user to define a new web feed or update an existing web feed by using a graphical interface.

A web feed is created once and can then be distributed repeatedly (or according to predefined schedule) in order to obtain desired content from a remote website associated therewith in a structured format. In this sense, the method, computer program product and system are a visual application programming interface (API) creator for any website, without the need for programming.

The content of a remote website is retrieved by the web feed while being formatted in a structured format. This content can be used by the system to manipulate, transform, and use the content. The content can be processed by programs that can be accessed via the primary web site but this is not necessarily so. For example, users can create their own programs in any programming language that use the output of any available web feed.

The web feed creation process entails browsing the remote website inside the primary website, defining which portions (elements) of the content of the remote website will be desired in the future, and assigning semantic meanings (in the form of a name and groupings) to these content elements (e.g. "Article Author"). When the web feed is distributed (for example—when the user requests content via the web feed), the system extracts the desired content from the remote website as it exists at that point in time, and then names each piece of content using the semantic definitions that the user originally supplied. As a result of the aggregate assignment of semantic information to portions of websites, the system builds, over time, a semantic understanding of the web.

In order to define a web feed, users go through an interactive visual process. This process entails supplying the system with one or more exemplary pages on a remote website which include content of interest. The exemplary pages conveniently have the same layout and structure, but different content (e.g. the results of several searches on a search engine). Furthermore, the user can choose input variables (e.g. "search term" or login information) through a visual interface on the primary website.

Once the user has submitted the exemplary pages on the remote website, the system performs an algorithmic analysis of these exemplary pages. This analysis identifies similarities between the different exemplary pages and between elements within each exemplary page. The result is programmatic understanding of the pages' structures which gets stored and is used as the basis for the new web feed.

The user selects desired content by clicking on various elements in the exemplary pages and assigns a name to each content type (e.g. "Search Result Title"). The user can also define and name relationships between content types, including grouping several content types together (e.g. "Search Result Title" and "Search Result Summary" belong to a "Search Result"). This process is entirely visual and point-and-click, thereby allowing a user to construct a sophisticated and powerful API with no programming.

The web feed is encoded within the system as a between the names (and additionally or alternatively tags or attributes) the user supplied and the technical information necessary to extract the relevant content from any instance of similar pages on the website. In addition to this, the web feed may be described by additional metadata that the user supplies such as data type (string, integer etc.), length and other attributes. In addition the user may define for each content type (field) a certain constrain or post processing rule (e.g. regular expression which removes strings matching "X" or a delimiter string that dissects the content into multiple instances).

According to an embodiment of the invention the web feed can become readily available for users of the system. The individual contributions of each user construct a comprehensive database that enables a complete coverage of the web in the form of semantic understanding and programmatic interaction with websites.

In order to interact with any web feed, a user uses or creates software that communicates with the system over the web using a URL. As such, the output of any web feed is available on the web at a specific address. The URL provides the mechanism for supplying variable inputs and requesting the desired output, as well as the means for passing the relevant contents on which to run various algorithms that can be applied by the system.

Upon receiving any such request, the system runs its algorithms on the content of the remote website as it exists at that moment in time, and compares its results to the mapping stored in the web feed. Using this method, the system extracts the relevant content and names the content pieces using the mapping defined by the user during the creation phase. The system returns the named content in any of several formats, including XML.

In addition to user-created web feeds, the system is capable of the automatic creation of new web feeds and modification of existing web feeds. By automatically examining similarities between web contents, the system is able to harness the information of an existing web feed to improve upon it or create a new web feed. This provides the system with an ever-growing coverage of the web which is not restricted by the need for user interaction.

The system interfaces between content owners or content providers and content consumers. According to an embodiment of the invention, the system can enforce content usage and/or content access limitations imposed by the content owners or content providers. For example, content providers can specify preferences and terms of use for their content using a web-based interface. Content consumers are able to register their needs and agree to the terms set forth by content providers. This embodiment provides both the technological means to access the content provider's content as well as the legal legitimacy required to do so. The content exchange platform allows for various forms of compensation to the content owner from the content consumer, including financial, link-driven traffic, and brand exposure. The system can automatically create, enforce, and execute a business agreement between the two parties.

According to various embodiments of the invention semantic information captured by the system in the web feed creation phase and through automatic web-service creation can be leveraged in a variety of ways. The system semantic understanding of websites can be used to enable searching the web using semantic information (e.g. "find all pages that contain recipes with less than 200 calories.") In doing so, the system empowers existing information retrieval tools that treat the web as a structured dataset to locate and retrieve information in a more powerful and precise manner.

According to yet further embodiments of the invention this semantic understanding can be applied to advertising networks to better match and target advertisements to content. By using the method, system and computer program product to create a feed and semantically describe their site, website owners can place semantic based advertisements that directly relate to an understanding of the content, as opposed to traditional methods of keyword matching (e.g. "provide a link to my supermarket checkout with a pre-filled shopping cart whenever a list of ingredients exists."). For advertising or affiliate network feeds that have an API website owners can also use this semantic information to programmatically select between existing affiliate network feeds to choose both the most appropriate merchant and dynamically display the most appropriate merchant products for each page on their site. If the merchant, or advertiser, does not have an appropriate web feed, this invention can be used to easily create such a web feed.

The system and especially web feed related information can be utilized by applications, services, websites, and devices that reuse content from the web. This content as either owned by the content user or by a third party.

Conveniently, equivalency engine 430 is being used in the two processes of creating a new web feed and running an existing web feed over a page. However, its input and output is different. At the creation process, the equivalency engine receives a sample of pages upon which it runs and executes all of the ECMs. The result of this process is the assignment of a set of keys (per ECM) for every element in the page. This mapping between keys and elements is then used in the GUI of the system. As described above, the user chooses an element in the GUI. When a user chooses an element she, in effect, chooses a (possibly complete) sub-set of keys associated with the element, and can add additional characteristics such as pattern matching constraints. The user is provided with visual feedback from the system as it singles out the other elements in the page that share keys with the element chosen. So to further the example described above, if the user clicked on an element whose tag is a link (<a href="X"></a>), all of the other links in the page will be highlighted, representing all elements that are also links. Through the GUL the user can then define intuitively the set of keys (e.g. key that relates to the ECM matching element tags) and the value of the key (<a> tag) she'd like as output of the web feed she defines.

The web feed distribution process is conducted after the web feed has been defined, and the subsets of keys and their respective values have been defined by the user, along with any other characteristics she saw fit. The equivalency engine performs a different task in this mode. It gets as input the page to run on, along with the chosen set of keys, their values and other characteristics. Then the Runner runs over the provided page, executing the ECMs and producing values for all of the keys. As it runs over the page and produces keys, it checks against the uploaded web feed definition, looking for matching elements and content that got key values equal to the ones stored in the WS. If there is a match and the other characteristics are met, the element content is added to the structured content output. At the end of the process, the equivalency engine outputs the structured content aggregated during the pass over the page.

There are two modes, one for regular users and one for power users. Regular users don't select keys directly, but rather either by clicking directly on the content, or by clicking on various controls. The regular, direct click algorithm takes into account the prior state of the element that receives the click, the tagset on the element, and other elements that have already been selected. The algorithm analyzes this information and then modifies the set of selected items appropriately—while trying to minimize the changes to selection that the user made (as opposed to those selected algorithmically). The regular interface may also provide various controls, for example: (i) A table control that give the user control to select table specific artifacts from a page (e.g. a column or row); (ii) An isolation control which allows the user to limit the scope of search for equivalent elements; (iii) A sensitivity control which gives the user control over the number and type of keys used for equivalence; (iv) A regular expression control which allows the user to select sub-parts of an elements content.

A power mode can be combinations directly. In this mode through the GUI of the various sets can select sets of keys directly.

FIG. 1 illustrates method 100 for generating a web feed according to an embodiment of the invention.

Method 100 stares by stage 110 of displaying a graphical interface to a user that browses to a primary website. Such a web site can be www.dapper.org, but, this is not necessarily so.

According to an embodiment of the invention the graphical interface includes a window for inserting a remote web page locator such as a Uniform Resource Locator. The graphical interface also includes various mechanisms to allow a user to browse in order to find the appropriate page.

Stage 110 is followed by stage 120 of receiving one or more web pages of a remote web site from a user that browses to the primary web site. The web pages can be received one at a time, after being selected by the user. The selection utilizes the graphical interface.

Stage 120 can include: (i) stage 122 of receiving browsing information such as indicator information and browsing to the remote web site that is identified by the locator, (ii) stage 124 of enforcing access and/or usage policies or rules of the remote web site, (iii) stage 126 of displaying a web page of the remote web in response to input provided by the user, and the like.

It is noted that stage 124 of enforcing can include preventing a user to access the remote web site, preventing the user from accessing a certain web page of the remote web site, preventing the user from downloading certain content, conditioning the access to content or retrieval of content, and the like. The conditioning can include limiting the number of accesses of the user per time period, require the user to pass one or more tests (such as inserting text representative of a wrapped image), can require the user to pay for access of for certain information, and the like. In this sense the primary web site enables the remote web site to enforce its access and/or usage policies.

It is noted that these access and/or usage policies can be applied each time the remote web site is accesses or content is retrieved during a distribution of a web feed that includes content from that remote web site.

Stage 120 can involve multiple repetitions of either one of stage 122-126 such as to provide one or more web pages for analysis.

Stage 120 is followed by stage 140 of calculating equivalent classes, each equivalent class includes web content representation elements that are mutually equivalent.

According to an embodiment of the invention stage 140 includes calculating equivalent classes by an equivalency engine (also referred to as equivalency engine or core engine). At the end of stage 120 the equivalency engine can receive one or more sample web pages or URLs that form a sample set. The sample set can be of any size, from a single page upwards.

According to various embodiments of the invention if the sample set includes multiple web pages than the equivalency engine can differentiate between static elements (static content) and the dynamic elements (dynamic content) within the sample set. The differentiating can include ignoring dynamic elements. Static content is defined as content that repeats on any or many of the samples while dynamic content includes content that changes from page to page. For example, if three samples of different search results from a search engine will all consider the logo of the search engine to be static content, but will contain different results, unique to each page, which will be considered dynamic.

According to various embodiments of the invention stage 140 can include at least one of the following or a combination thereof: (i) calculating at least one key for each element; (ii) storing the at least one key per element; (iii) calculating multiple keys of different abstraction level per element; (iv) choosing to store a subset of the associated keys, thus defining the strictness and looseness of the field definition; (v) calculating equivalent classes in response to structural characteristics of the elements; (vi) determining an equivalency of a first element and a second element in response to a characteristic of equivalent elements of the first element and a characteristic of the second element; (vii) calculating equivalent classes in response to previous elections of the user; (viii) calculating equivalent classes in response to elections of another user; (ix) calculating equivalent classes in response to an indication representative of an equivalency level of an equivalency class; (x) calculating equivalent classes in response to an indication representative of a scope of a search for equivalent element.

According to an embodiment of the invention stage 140 the calculating of equivalency classes includes linking elements in a web content representation (such as in a document object module (DOM) representation of a web page or another semi-structured web format such as but not limited to RSS). Equivalence can be defined as structural equivalence and can be defined by one or more different heuristics.

Conveniently, keys generated during stage 120 allow for easy identification of classes of web page sub-trees that have equivalent structure. The keys can be assigned based upon key definitions that can be updated over time. These keys are conveniently robust to changes on a page.

A sample equivalence class describes the "Most Complex Structure" (MCS) within a DOM representation of a web page which is the oldest (closest to the root of the DOM) but has a similar static sub-tree structure.

The MCS computation algorithm can use examples to differentiate between static and dynamic elements in a page (static elements do not change for different instances of a page, while dynamic elements can change for each instance of a page). For example if a user searched for the term "dapper" on Google™ (thus the web site www.google.com is the remote web site then the search result will include multiple web pages that have a similar structure (simplified for illustration purposes): (i) Title—Bolded version of the search term; (ii) Description—Bolded version of the search term, URL, Size, "Cached: link, "Similar pages" link, "Note this" link, "More results" link. It is noted that dynamic elements are in italics. They do not show up for every repeating structure.

Conveniently, stage 120 includes calculates keys that describe the element and its relative structure within the DOM. These keys are used to calculate similarity between different structures. Different types of keys can be used in order to compute different types of equivalences (or similarity).

A key is computed for each element which describes a structural characteristic of the element. An element with multiple children that have the same key, defines a Most Complex Structure (MCS) which is the oldest (closest to the root of the DOM) but has a similar static sub-tree structure. For elements that have no such MCS the root tag (HTML) is considered the MCS ancestor. Each MCS defines an MCS element key which defines it as an MCS, and allows elements to easily be linked to their MCS ancestor.

Conveniently, stage 120 includes generating an internal element key for each element. This internal key element includes multiple attributes such as: (i) HTML tag, (ii) static content of the element (where applicable); (iii) MCS ancestor (where applicable); and (iv) relative offset from the MCS ancestor (using a DFS numbering scheme—where applicable).

Conveniently, stage 120 includes generating a cousin key for each element. The cousin key includes: (i) a tag, (ii) an MCS Tag, (iii) an MCS Key, (iv) an absolute level (from the root of the tree), and (v) relative level from MCS ancestor.

According to an embodiment of the invention stage 120 further includes generating easily retrievable data structures representative of the equivalency classes. Samples of easily retrievable data structures can include: (i) a first list of all of an elements descendant tags; (ii) a second list that includes an element's level, tag_name, EKMC.

Stage 120 conveniently includes a heuristic determining that two elements are equivalent if a ratio between the number of unique first list elements (that exist in only in one MCS) and the number of first list elements in their union is less than some constant.

Stage 120 can assign a unique key per each table element, another key per each table row, a further key per each table column and yet a further key for all the cells of the table.

Yet according to another embodiment of the invention stage 140 can include utilizing one or more equivalency class that was calculated in the past. These equivalency classes can be calculated in relation to one or other users, can be responsive to inputs of one or more other users and the like. Thus, instead of calculating new equivalency classes stage 120 can involve utilizing previously calculated equivalency classes.

Stage 140 is followed by stage 160 of receiving selection information representative of a selection of an element out of multiple elements of a web content representation. The selection can be made by simply clicking on a selected element of a web page of a remote web site that is being displayed to the user.

Stage 160 is followed by stage 180 of generating an equivalent indication representative of at least one equivalent element that is similar to the selected element. Stage 180 can include emphasizing equivalent elements of the displayed web page. The emphasis can include highlighting equivalent elements, surrounding these equivalent elements by a frame, or utilizing any known graphical technique.

Stage 180 is followed by stage 200 allowing a user to respond to the generation of the equivalent indication. The user can perform at least one of the following or a combination thereof: (i) select at least one equivalent element and optionally define its associated meta-data and/or semantic information; (ii) de-select at least one equivalent element; (iii) de-select the selected element; (iv) elect a non-equivalent element; (v) change at least one characteristic of the similarity algorithm.

It is noted that multiple iterations of stage 180 can occur and the user can provide an end of stage indication before method 100 continues to stage 240.

It is further noted that the response of the user can cause method 100 to try to find a minimal equivalency class such as to include only the selected element and the equivalent elements that were selected (or not de-selected) by the user.

Stage 200 can include waiting for a certain period (that can be time limited) but this is not necessarily so. The user can receive reminders that urge him to either perform one or more of the mentioned above operations) or to terminate the election stage. It is noted that the user can perform multiple elections.

Stage 200 is followed by stage 240 of defining a web feed. The web feed will include a selected element and can include one or more equivalent elements. The one or more equivalent elements can be selected by the user (either by positively electing the equivalent element or by merely not de-selecting an equivalent element).

Conveniently, the generation of a web feed also involves receiving and processing metadata such as but not limited to semantic content. The metadata can include linking information that links between selected items, a user definition of one or more selected items, and the like.

For example, a user can define hierarchies by creating a group of elements. This definition is received during stage 200. The user can choose (and the method receives) any combination of elements and previously defined groups of elements to define a new group. Once a group is defined (conveniently by the user) the method receives metadata that reflects relationships between repeating instances of different elements. For example, assume that during stage 120 multiple search result web pages are received. A typical search result web page includes search results, each including a title with a link to the search result and a summary of the page linked. After defining two fields: "title" and "summary", the user can define a group named "search result" that will facilitate an association of the first result title with the first result summary, the second result title with the second result summary, and so on, allowing an equivalency engine to return results in an hierarchically structured format. Optionally, the user can also define more complex hierarchies such as groups inside groups and groups that contain both groups and fields. Once the user has finished defining the fields and groups, she can give the web feed a name and additional meta-data such as tags and description, save it and start using it.

Stage 200 is also followed by stage 250 of processing received metadata. The metadata (and information) relates to the selected element and to equivalent elements. The metadata can relate to equivalent elements.

Stage 250 includes mapping between names included in received metadata and technical information necessary to extract relevant content from any instance of similar pages on the website. It can also include creating an XML representation of the feed to be created. The web feed data structure can include information relating to web feeds generated by users as well as information that associate between related web feeds. Web feeds can be related to each other if they associated with similar metadata (especially similar semantic metadata). Similarity between web feeds can be learnt from the identity of users that subscribed and/or defined the web feeds. If certain users subscribed to certain web feeds they can be associated to each other. Statistics relating to the subscription to web feeds, timing between subscription to different web feeds, identity of users that subscribed to different web feeds, unsubscribing from web feeds, and/or metadata that links the web feeds to each other can provide an indication about the association level between different web feeds.

The web feed data structure or at least portion thereof (especially semantic information relating to web feeds) can be exposed to multiple users. According to an embodiment of the invention the web feed can become readily available for users of the system. The individual contributions of each user can construct a web feed data structure that enables a significant (even full) coverage of the web in the form of semantic understanding and programmatic interaction with websites.

Conveniently, stage 250 is followed by stage 270 of creating the appropriate web feed format. The user can select the type of feed requested and the system creates the web feed from the internal XML.

Conveniently, method 200 includes stage 290 of automatically creating web feeds and, additionally or alternatively modifying existing web feeds. Stage 290 can include examining similarities between web pages, based upon the content of the web feed data structure. For example, if after running the standard key generating algorithms another web site has the same set of keys (or similar keys based on some heuristic), the system can use the same selections and semantic information provided by the user for the original web site.

According to an embodiment of the invention, method 200 includes stage 295 of searching web pages based upon semantic information (or other meta-data) associated with these web feeds (e.g. "find all web pages that include recipes with less than 200 calories".)

According to an embodiment of the invention, method 200 includes stage 297 in which semantic understanding can be applied to advertising networks or affiliate networks that have an API. Website owners can use this semantic information to programmatically select between existing affiliate network feeds to choose both the most appropriate merchant and dynamically display the most appropriate merchant products for each page on their site. If the merchant or advertiser does not have an appropriate web feed, this invention can be used to easily create such a web feed.

According to other embodiments of the invention, the system can be used to better match and target advertisements, or merchandise to content. Website owners can place the system semantic powered advertising that directly relates to an understanding of the content, as opposed to traditional methods of keyword matching (e.g. "provide a link to my supermarket checkout with a pre-filled shopping cart whenever a list of ingredients exists.")

After creating a web feed, the user may choose to edit the web feed or create a new web feed based on it. The process of editing a web feed is conveniently similar to the process of creating one, except for the fact that the user need not supply the pages to work on and the web feed is pre-defined.

Figure 2:
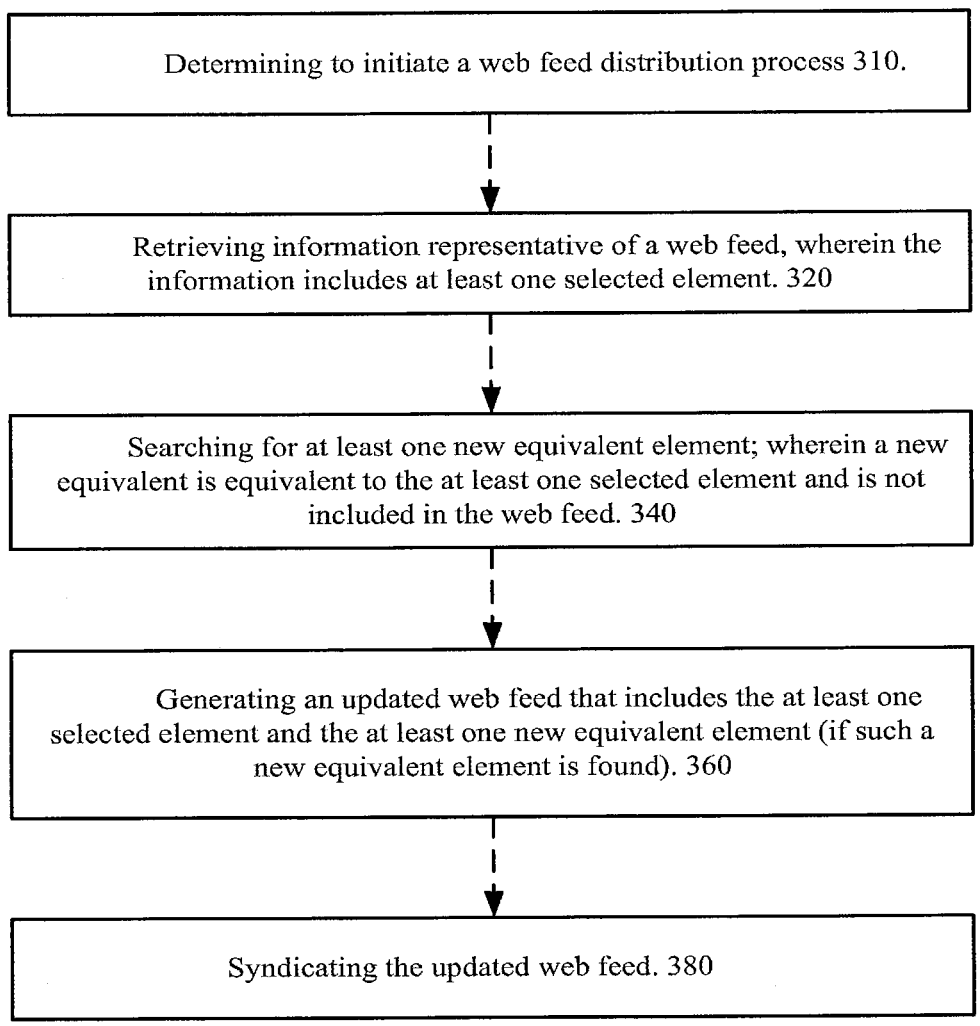
FIG. 2 illustrates a method for distributing a web feed, according to an embodiment of the invention.

FIG. 2 illustrates method 300 for distributing a web feed according to an embodiment of the invention.

Stage 310 starts by stage 310 of determining to initiate a web feed distribution process or receiving a trigger that triggers a web feed distribution process.

Stage 310 is followed by stage 320 of retrieving information representative of a web feed, wherein the information includes at least one selected element.

Stage 320 is followed by stage 340 of searching for at least one new equivalent element; wherein a new equivalent is equivalent to the at least one selected element and is not included in the web feed. Stage 340 can include generating the newly retrieved web page and calculating equivalency classes, in a manner than is analogues to stage 120.

Stage 340 is followed by stage 350. If the new keys generated for the website are different, according to some metric, than the original keys—then the system will notify the user (either by email or otherwise) of the fact that their feed has degraded and may no longer work properly as described in stage 350.

Stage 340 is followed by stage 360 of generating an updated web feed that includes the at least one selected element and the at least one new equivalent element, if the at least one new equivalent element was found during stage 340.

Stage 360 is followed by stage 380 of syndicating the updated web feed.

Figure 3:
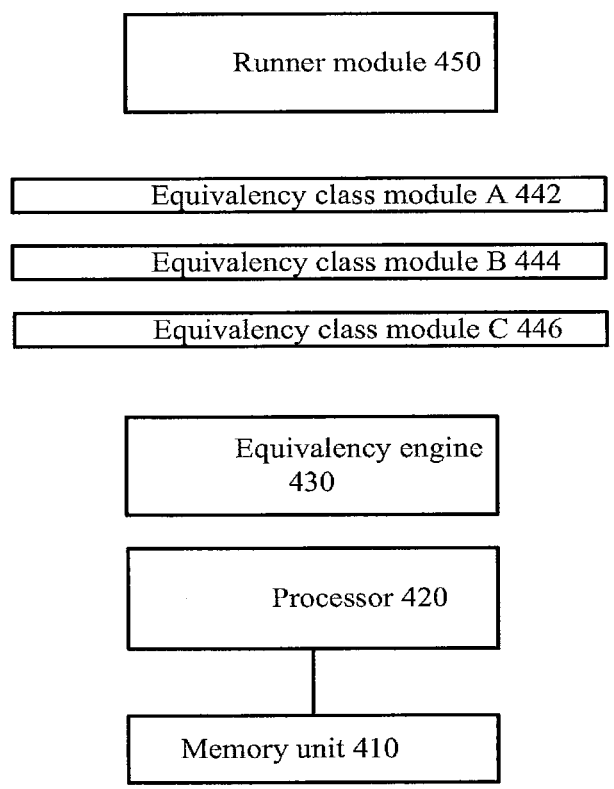
FIG. 3 illustrates a system according to an embodiment of the invention.

FIG. 3 illustrates system 400 according to an embodiment of the invention.

System 400 can include various software, firmware, middleware and/or hardware components. It is typically connected to users via one or more networks.

System 400 may represent practically any type of computer, computer system or other programmable electronic device. System 400 may be connected in a network or may be a stand-alone device in the alternative. System 400 can be connected to other devices via wired and/or wireless links. It is noted that system 400 can be characterized by a centralized architecture but that it can also be characterized by a distributed architecture. Accordingly, the various components of system 400 can be located near each other, but this is not necessarily so.

FIG. 3 illustrates system 400 as including memory unit 410, and processor 420. Memory unit 410 is adapted to store information representative of a web feed, wherein the information includes at least one selected element. Memory unit 410 can store the web feed data structure or portions thereof Processor 420 is adapted to search for at least one new equivalent element. A new equivalent is equivalent to at least one selected element that and is not included in the web feed. Processor 420 is also adapted to generate an updated web feed that includes the at least one selected element and the at least one new equivalent element; and to syndicate the updated web feed.

It is noted that system 400 can perform various stages of method 100 and, additionally or alternatively, can perform various stages of method 300.

According to an embodiment of the invention memory unit 410 is adapted to store selection information representative of a selection of selected elements out of multiple elements of a web content representation, and processor 420 is adapted to generate an equivalent indication representative of at least one equivalent element that is similar to the selected elements; wait for a user to elect at least one equivalent element; and define a web feed that comprises the selected element and at least one equivalent element, if at least one equivalent element exists.

FIG. 3 also illustrates various modules. These modules can be software modules that are executed by processor 420 but this is not necessarily so.

Equivalency engine 430 can calculate equivalency classes, can locate elements that are equivalent to selected elements, and the like.

Equivalency class modules A-C 442-446 are sample equivalency engines. Each includes information representative of mutually equivalent elements. These modules as well as additional modules (such as metadata module) can form a web feed data structure.

Runner module 450 scans web pages and sends elements of these web pages to the equivalency engine.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 4:
FIG. 4 illustrates a screen displayed to a user, according to an embodiment of the invention.
Figure 4:
Figure 4:
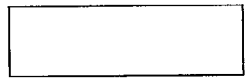
Figure 4:
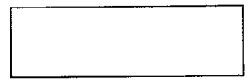
Figure 4:
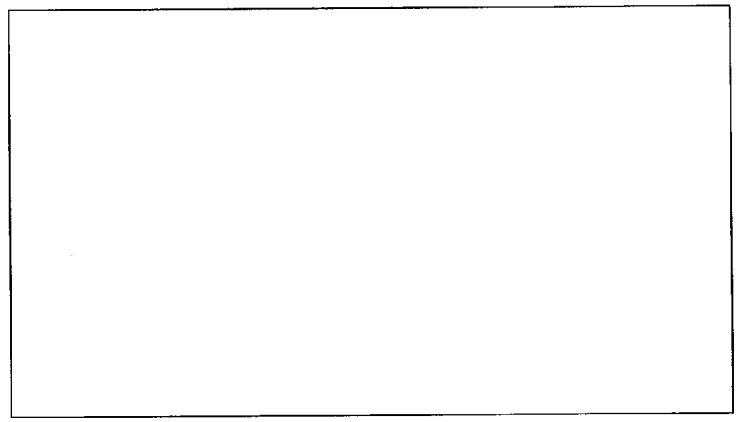
Figure 4:
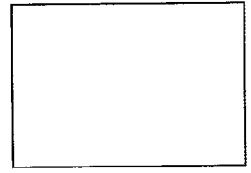
Figure 4:
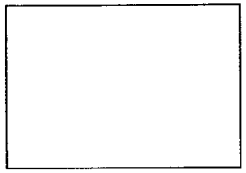
Figure 4:
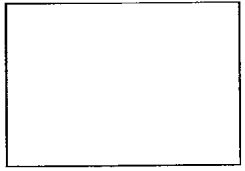
Figure 4:
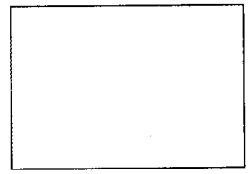

During the definition of a web feed multiple screens can be displayed to the user. FIG. 4 illustrates presented an illustrative sample screen 500 that is presented to a user during the definition of the web feed, according to an embodiment of the invention.

Screen 500 includes various control icons 502, 505 and 506, web page display area 510, selected element area 520 and group area 530. It is noted the screen is displayed after a user browses to the primary website and enters a URL or other information that represents a web site that is displayed (or one of its pages is displayed). It is noted that the user can also select the format of the web feed.

Web page display area 510 is used to display web pages, either in their original format or including highlighted elements that can represent a selected element and, additionally or alternatively, one or more equivalent elements.

Control icon "change similarity detection" 502 can be used to determine which equivalency algorithm is used and, additionally or alternatively, what is the equivalency level required to define two elements as equivalent items. Control icon "select inside" 506 allows a display of a portion of an element. Selected element area 520 is used to display selected elements. Field area 525 is used to display the field names given to selected elements. Group area 530 is used to display groups and the elements included in the groups. It is noted that names or other attributes of elements and groups can be displayed within areas 520 and 530. It also contains an interactive feed preview area 550.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A system for dynamically defining a web feed, the system comprising:
   a memory unit adapted to store web feed data and to generate a web feed of selected web content;
   an input processor in operative communication with the memory unit configured to receive a user input defining one or more remote websites and to retrieve remote web content from the one or more remote websites;
   a user interface configured to display a set of identified elements from the remote web content in a display area of a primary website;
   a selection processor in operative communication with the user interface configured to receive a user selection identifying one or more selected elements of the remote web content;
   an equivalency engine in operative communication with the selection processor and configured to calculate equivalency classes comprising subsets of the identified elements determined to be structurally similar to the selected elements;
   a web feed processor configured to generate a web feed for display to the user on the primary website, wherein the web feed includes at least the selected elements and one or more of the subsets of the identified elements determined to be structurally similar to the selected elements;
   wherein the selection processor is further configured to update the display area of the primary website to visually emphasize the identified elements from the remote web content that are determined to be structurally similar to the selected elements;
   wherein the selection processor is further configured to receive a second user selection selecting one or more other identified elements that were not visually emphasized, or de-selecting one or more visually emphasized elements; and
   wherein the equivalency engine is further configured to update the calculated equivalency classes based on the user selection of the identified elements or de-selection of the visually emphasized elements.

2. The system of claim 1, wherein the input processor is further configured to generate a set of identified elements from the remote web content and, for each respective identified element, calculate at least one key comprising data describing structural characteristics of the respective identified element.

3. The system of claim 2, wherein the calculating equivalency classes comprises:
   comparing the key for a first identified element to a second key for a second identified element to identify a structural similarity between the first and second identified elements; and
   determining whether the first and second identified elements are structurally equivalent.

4. The system of claim 1, further comprising a metadata module configured to receive metadata representing relationships between repeating instances of identified elements from the remote web content.

5. The system of claim 1, wherein the selection processor is further configured to receive a second user selection defining metadata or semantic information of the visually emphasized elements.

6. The system of claim 1, wherein the web feed processor is further configured to automatically search the one or more remote websites, to identify additional structurally similar elements, and to generate an updated web feed including the additional structurally similar elements.

7. A non-transitory computer readable storage medium having stored therein data representing instructions executable by a programmed processor for dynamically defining a web feed, the storage medium comprising instructions operative for:
   receiving a sample set including one or more remote webpages;
   extracting content from the one or more remote webpages to produce a set of identified elements;
   displaying the set of identified elements in a display area of a primary website;
   determining structural similarities of the set of identified elements;
   assigning a plurality of associated keys to each identified element in the set of identified elements, wherein each associated key describes a structural characteristic of the identified element;
   grouping in equivalence classes subsets of the identified elements which are determined to be structurally similar based at least on the associated keys;
   receiving a user selection identifying one or more selected elements from the set of identified elements displayed on the primary website;
   generating a web feed for display to the user in the display area of the primary website including at least the one or more selected elements and the subset of identified elements determined to be structurally similar to the selected element;
   updating the display area of the primary website to visually emphasize the subset of the identified elements from the remote web content that are determined to be structurally similar to the selected elements;
   receiving a user selection defining metadata or semantic information of the visually emphasized elements; and
   generating a semantic understanding of the remote website domain based on user defined metadata or semantic information.

8. The storage medium of claim 7, wherein the web feed is automatically updated and regenerated according to a predefined schedule.

9. The storage medium of claim 8, wherein the regenerating comprises automatically searching the one or more remote websites, identifying additional elements that are determined to be structurally to the subset of identified elements in the web feed, and generating an updated web feed including the additional elements determined to be structurally similar.

10. The storage medium of claim 7, further comprising instructions operative for determining at least one new equivalent element that is structurally similar to at least one identified element in the subset of identified elements, and automatically updating the web feed to display the new equivalent element.

11. A computer-implemented method using a processor for dynamically defining a web feed, the method comprising:

displaying a set of identified elements extracted from one or more remote webpages in a display area of a primary website;

assigning a plurality of associated keys to the each identified element in the set of identified elements, wherein each associated keyed describes a structural characteristic of the identified element;

determining structural similarities of the identified elements extracted from the one or more remote webpages;

grouping in equivalency classes a subset of the identified elements which are determined to be structurally similar based at least on the associated keys;

receiving a first user selection identifying one or more selected elements from the set of identified elements displayed on the primary website;

generating a web feed for display to the user in the display area of the primary website including at least the subset of identified elements determined to be structurally similar to the selected elements;

visually emphasizing the displayed identified elements that are determined to be structurally similar to the selected elements;

receiving a second user selection identifying one or more other selected elements from the set of identified elements displayed on the primary website; and updating the equivalency classes based on the second user selection.

12. The computer-implemented method of claim 11, wherein receiving the second user selection further comprises comprising receiving the second user selection confirming that the visually emphasized identified elements are structurally similar to the selected element.

13. The computer-implemented method of claim 11, further comprising identifying additional elements from the one or more remote web pages determined to be structurally similar to the selected elements, and automatically updating the displayed web feed to include the one or more additional elements.

* * * * *